United States Patent [19]
Chen

[11] Patent Number: 5,229,919
[45] Date of Patent: Jul. 20, 1993

[54] HARD DISK DRIVE CASE WITH ELECTRICAL SWITCH AND DUST GUARD FOR RECEIVING A HARD DISK DRIVE

[76] Inventor: Pao-Chin Chen, 3F, No. 129, Sec. 5, Roosevelt Road, Taipei, Taiwan

[21] Appl. No.: 932,778

[22] Filed: Aug. 20, 1992

[51] Int. Cl.⁵ .............................................. H05K 7/10
[52] U.S. Cl. .................................. 361/391; 361/380; 361/392
[58] Field of Search ........ 364/708; 361/380, 390–392, 361/395, 399; 439/928

[56] References Cited

U.S. PATENT DOCUMENTS 4,941,841  7/1990  Darden et al. ................. 364/708 X
5,187,643  2/1993  I-Shou ............................ 361/391

FOREIGN PATENT DOCUMENTS 2-262398  10/1990  Japan ................................ 361/39 D Primary Examiner—Leo P. Picard
Assistant Examiner—Michael W. Phillips
Attorney, Agent, or Firm—Bucknam and Archer

[57] ABSTRACT

A hard disk drive case to be fastened in a disk drive slot in either a desk top computer or a vertical computer for holding a notebook hard disk drive and permitting it to be drawn in and out. The hard disk drive case includes a bottom case having a dust guard pivotably hooked by two extension hooks to block a front disk drive slot thereof, a top cover covering the bottom case, and a connector electrically controlled by a micro switch through one extension hook for connecting the connector of the hard disk drive to be inserted.

1 Claim, 5 Drawing Sheets

HARD DISK DRIVE CASE WITH ELECTRICAL SWITCH AND DUST GUARD FOR RECEIVING A HARD DISK DRIVE

BACKGROUND OF THE INVENTION

The present invention relates to a hard disk drive case for receiving a hard disk drive and permitting it to be slid in and out.

A personal computer is generally equipped with a built-in hard disk drive and one or two floppy disk drives. A floppy disk drive in a computer system has a slot through which a floppy disk is inserted. Because the hard disk drive in a computer system is installed through a built-in method, the installation procedure of the hard disk drive is complicated, and the maintenance and repair of the hard disk drive is difficult to perform. In order to eliminate these problems, a hard disk drive is now commonly made to slide in and out of the housing of a computer system, i.e., a hard disk drive case is provided and detachably inserted into a disk drive slot on a computer system to hold a hard disk drive. Although various hard disk drive cases are known and widely in use, they are still not satisfactory in use. One disadvantage of these hard disk drive cases is that they may be displaced from position causing a contact failure. Another disadvantage of these hard disk drive cases is that they do not provide a safety switch to protect the hard disk drive, and therefore the hard disk drive may be damaged easily during the process of installation or dismantling. Still another disadvantage of these hard disk drive cases is that the internal electric circuit may be contaminated by dust causing an electric contact failure, because the disk drive slot is open to the outside. Still another disadvantage of these hard disk drive cases is that they are suitable only for a specific disk drive slot, and therefore different hard disk drives must be used for mounting hard disk drives in disk drive slots of different sizes.

SUMMARY OF THE INVENTION

The present invention eliminates the aforesaid disadvantages. It is therefore an object of the present invention to provide a hard disk drive case which can be installed in a disk drive slot on either a desk top computer or a vertical computer for mounting a hard disk drive permitting it to be drawn out and then pushed back into place. It is another object of the present invention to provide a hard disk drive case which uses two springs and two extension hooks to hook up a pivotable dust guard causing it to block up the disk drive slot against outside dust. It is another object of the present invention to provide a hard disk drive case which uses a micro switch to automatically cut off the circuit of the connector thereof as the hard disk drive is removed from place.

DETAILED DESCRIPTION OF THE PREFERRED EMBODIMENT

Figure 1:
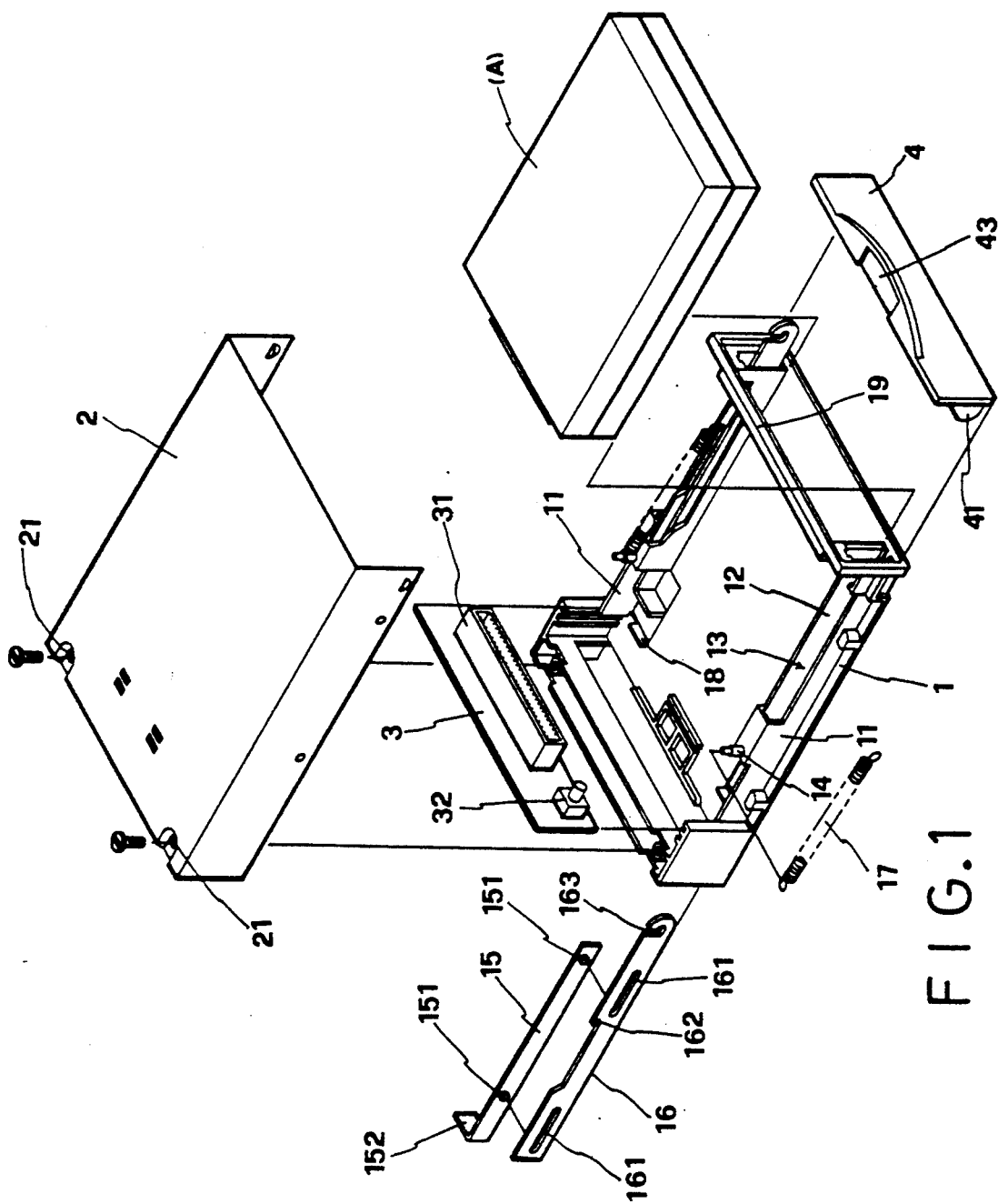
FIG. 1 is an exploded view of the preferred embodiment of the present invention.
Figure 2:
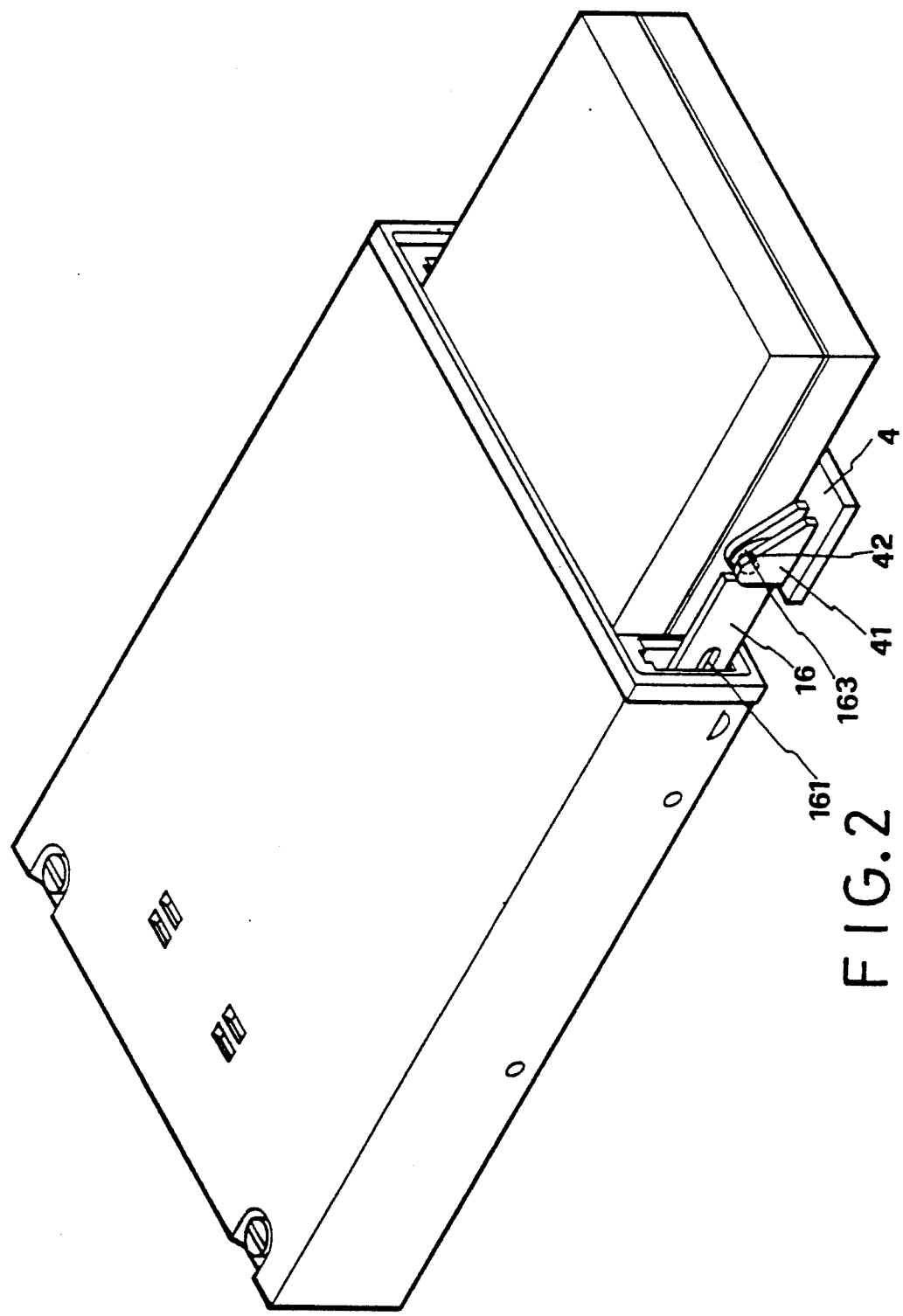
FIG. 2 is an elevational view thereof thereof.

Referring to FIGS. 1 and 2, a hard disk drive case according to the present invention is generally comprised of a bottom case 1, a top cover 2, an adapter 3, and a dust guard 4. The bottom case 1 fits into a 3½" disk drive slot, having two side walls 11 on two opposite long sides thereof, two wall ribs 12 on the inside respectively spaced from the side walls 11, two channels 13 respectively defined between the side walls 11 and the wall ribs 12, and two tenons 14 respectively raised from the wall ribs 12 at one end. Each channel 12 receives a pull rod 15 and an elongate hooked rod 16. The pull rod 15 has two pegs 151 spaced on one side thereof. The elongate hooked rod 16 has two spaced, elongated slots 161, which receive the pegs 151 of the pull rod 15 respectively, a notch 162 on the middle on which one end of a spring 17 is hooked, which spring 17 has an opposite end hooked on the tenon 14 of either wall rib 12, and a hooked portion 163 on one end hooked on the dust guard 4. The pull rod 15 has one end terminated into an angle rod 152 extended out of the respective channel 13 to stop the hard disk drive (A) being inserted. The bottom case 1 further comprises two upright stop plates 18 on two opposite locations behind the channels 13 for stopping the respective pull rod 15, and a front hollow frame 19 through which a hard diskdrive (A) is inserted. The top cover 2 is made from a channel plate having holes 21 at suitable locations through which screws are threaded into respective screw holes (not shown) on the bottom case 1 to connect the top cover 2 and the bottom case 1 together. The adapter 3 is a printed circuit board fastened inside the bottom case 1 at the rear end, having a connector 31 which receives the connector of the hard disk drive (A) being inserted, and a micro switch 32 on one end corresponding to the angle rod 152 of the pull rod 15 in the corresponding channel 13 of the bottom case 1. The dust guard 4 is made in the shape of an elongate flat plate having two opposite pairs of parallel wings 41 upstanding from a top edge thereof, and a finger plate 43 vertically and downwardly extended from a front edge thereof, wherein each pair of parallel wings 41 are connected by a cross rod 42 (see FIG. 2) on which the hooked portion 163 of the respective elongate hooked rod 16 is hooked for permitting the cross rod 42 to be rotated thereon.

Referring to FIG. 2 again, the dust guard 4 is pulled outward and rotated downward from a vertical position to a horizontal position, and therefore a hard disk drive (A) can be inserted through the hollow frame 19 into the bottom case 1. As soon as the hard disk drive (A) was inserted into the bottom case 1, the dust guard 4 is automatically pulled back from the horizontal position to the vertical position by the springs 17 via the elongate hooks 16. As the same time, the connector of the hard disk drive (A) is connected to the connector 31 of the adapter 3, and the micro switch 32 is triggered by the angle rod 152 of the corresponding pull rod 15 to electrically connect the circuit.

Figure 3:
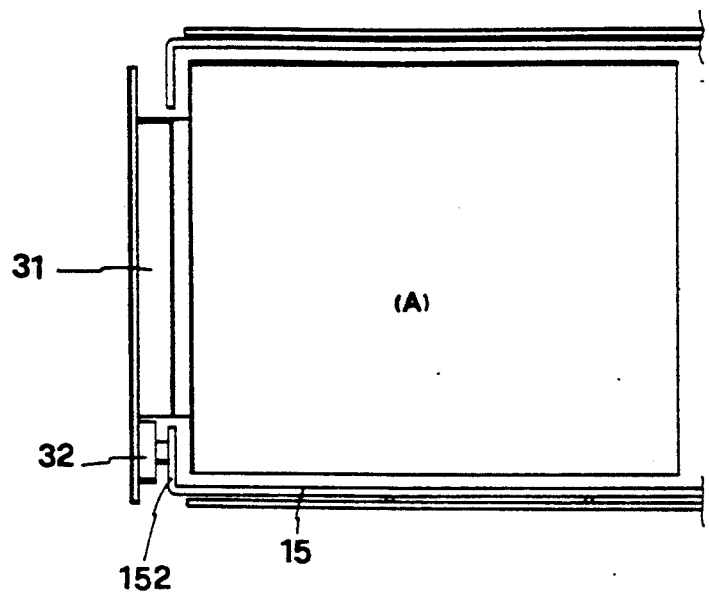
FIGS. 3, 4 and 5 are flow charts showing the procedure in detaching the connector of the adapter on the bottom case of the hard disk drive case from the connector of the hard disk drive.
Figure 4:
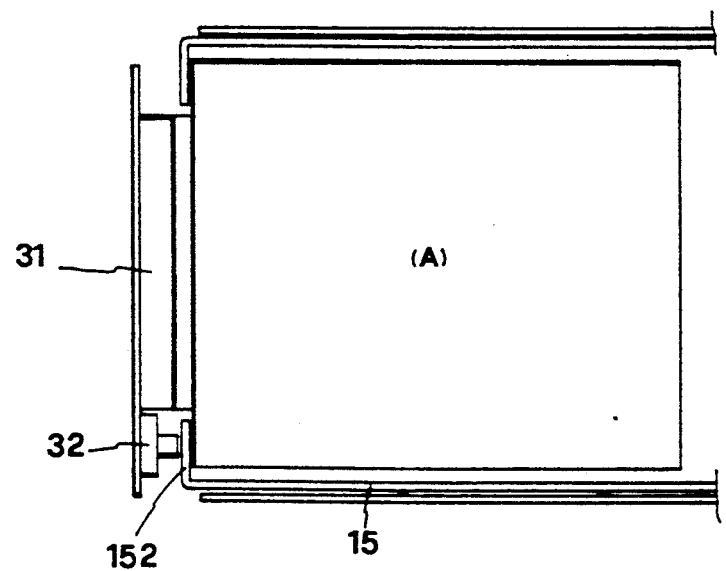
Figure 5:
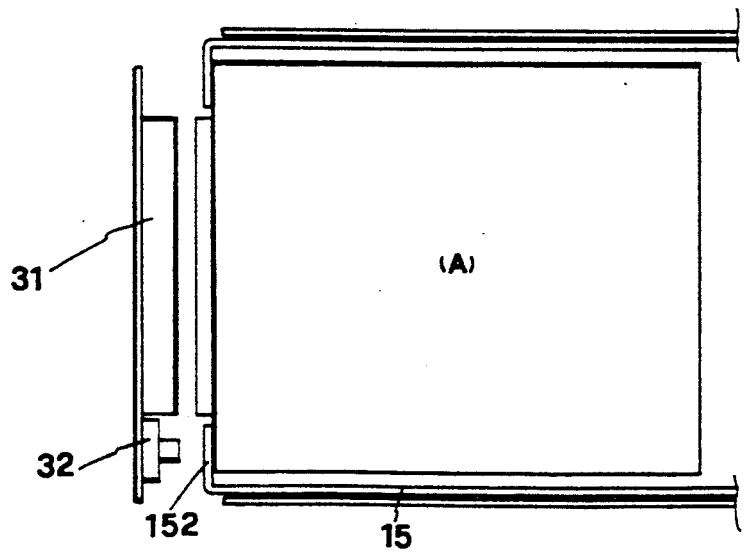

Referring to FIGS. 3, 4 and 5, the connector 31 of the adapter 3 is electrically connected to the connector of the hard disk drive (A) as the micro switch 32 is pressed by the angle rod 152 of the corresponding pull rod 15. As the dust guard 4 is rotated from the vertical position to the horizontal position by the fingers through the finger plate 43, the angle rod 152 of each pull rod 15 is respectively carried outward by the respective elongate hooked rod 16, and therefore the angle rod 152 of the corresponding pull rod 15 is disconnected from the micro switch 32 to cut off the circuit as the connector 31 of the adapter 3 is still connected to the connector of the hard disk drive (A). Therefore, the hard disk drive (A) can be drawn out of the hard disk drive case. Once the hard disk drive was removed out of the hard disk drive case, the two elongate hooks 16 are forced by the respective springs 17 to pull the dust guard 4 back to its original vertical position in blocking up the hollow frame 19 against outside dust.

Figure 6:
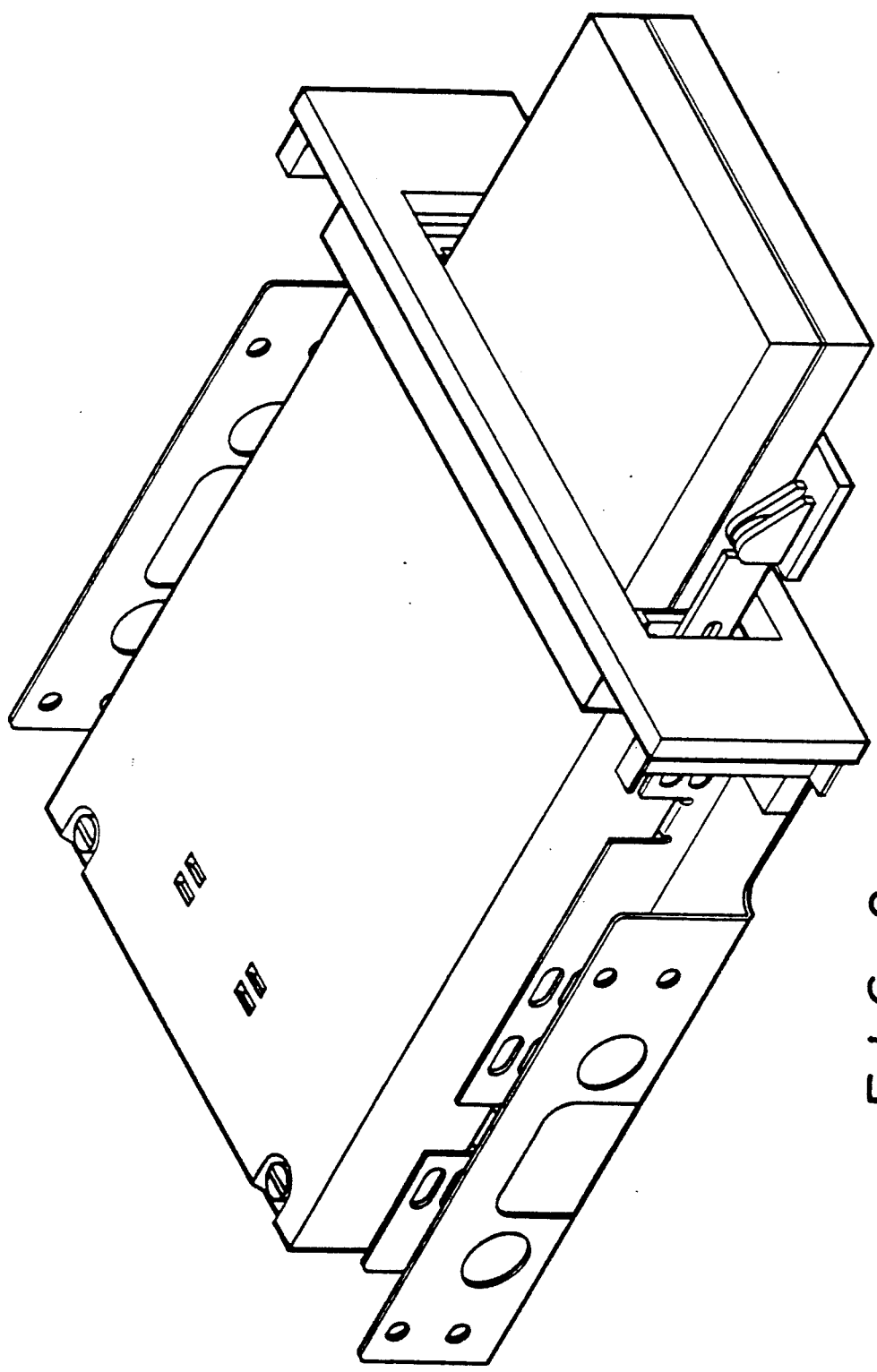
FIG. 6 illustrates an installed example of the hard disk drive case in a 5¼" disk drive mounting frame to receive a notebook computer hard disk drive.

Referring to FIG. 6, the hard disk drive case may be fastened to a 5¼" disk drive mounting frame for mounting a notebook computer hard disk drive.

Figure 7:
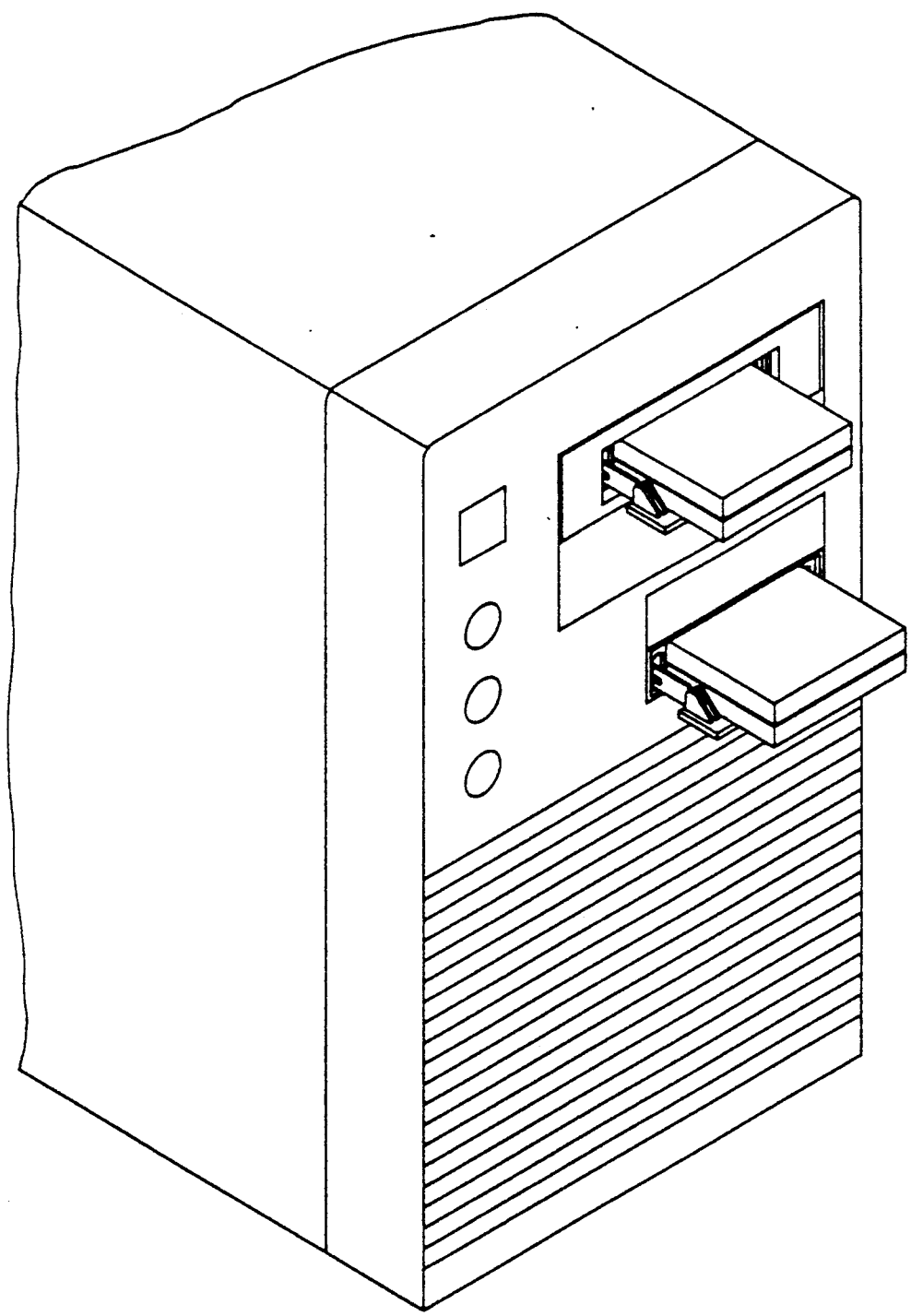
FIG. 7 illustrates a vertical computer having two hard disk drive cases of the present invention respectively fastened in the 5¼" disk drive slot and the 3½" disk drive slot thereof to hold a respective notebook hard disk drive.

Referring to FIG. 7, hard disk drive cases of the present invention may be respectively fastened in the 5¼" disk drive slot and the 3½" disk drive slot of a vertical computer to hold two notebook hard disk drives respectively.

As indicated, the present invention is to provide a hard disk drive case which can be fastened in a 5¼" disk drive slot as well as a 3½" disk drive slot of a desk top computer or a vertical computer to hold a notebook hard disk drive.

What is claimed is:

1. A hard disk drive case comprising:

a bottom case having two side walls on two opposite long sides thereof, two wall ribs on the inside respectively spaced from said two side walls, two channels respectively defined between said side walls and said wall ribs, and two tenons respectively raised from said wall ribs at one end, two pull rod assemblies respectively fastened in either channel, two upright stop plates on two opposite locations spaced from said channels at one end, and a front disk drive slot through which a hard disk drive may be inserted, two pull rod assemblies respectively inserted in either channel and stopped by either upright stop plate, said pull rod assemblies each comprising a pull rod movably connected to an elongate hooked rod, the pull rod of each pull rod assembly having two spaced pegs respectively inserted in a respective elongate hole on the corresponding elongate hooked rod and a rear end terminated into an angle rod limited by either upright stop plate, the elongate hooked rod of each pull rod assembly having a hook hole on the middle and a front end terminated into a hook, and two springs respectively connected between either wall rib and either pull rod assembly, said springs each having one end fastened to the tenon on either wall rib and an opposite end fastened in the hook hole on the elongate hooked rod of either pull rod assembly;

a top cover made from a channel plate covered over said bottom case and secured in place by screws;

a connector assembly fastened inside said bottom case at an opposite end spaced from said front disk drive slot, said connector assembly having a connector for connecting the connector of the hard disk drive inserted into said bottom case and a micro switch controlled by the angle rod of the pull rod of one pull rod assembly to electrically connect or disconnect the electric circuit of the connector assembly; and a dust guard made from a flat plate having two opposite pairs of parallel wings upstanding from a top edge thereof, and a finger plate vertically and downwardly extended from a front edge thereof, each pair of parallel wings being connected by a cross rod pivotably hooked by the hook of the elongate hooked rod of either pull rod assembly.

* * * * *